United States Patent Office 3,395,347
Patented July 30, 1968

3,395,347
PRECISION HIGH-SPEED ELECTRONIC SYSTEM FOR THE LOGARITHMIC MEASUREMENT OF RADIO FREQUENCY POWER LEVELS
John S. Hollis and Jack B. Chastain, Atlanta, Ga., assignors to Scientific-Atlanta, Inc., Doraville, Ga., a corporation of Georgia
Filed Mar. 3, 1964, Ser. No. 349,033
4 Claims. (Cl. 324—99)

ABSTRACT OF THE DISCLOSURE

What is disclosed herein is an electronic measuring system for the precision high-speed logarithmic measurement of radio frequency power. Specifically, what is disclosed herein is a radio frequency signal power measuring system which includes a frequency converter for converting an RF signal to an IF signal, a circuit means for combining on a time sharing basis an exponentially decaying voltage and the IF signal to provide a composite voltage envelope having the decaying voltage in time intervals alternating with time intervals having the IF signal, amplifying and rectifying means for amplifying and rectifying the composite voltage envelope to provide a rectified voltage envelope which decays exponentially in each of a plurality of time intervals alternating with time intervals having an amplified and rectified IF signal voltage, start means for initiating a start pulse each time the voltage of the rectified voltage envelope is a particular reference voltage, comparing means for comparing a rectified voltage envelope with a rectified IF signal voltage to initiate a stop pulse when the voltage of the rectified voltage envelope is equal to the rectified IF signal voltage, and means responsive to the time interval between a start pulse nad a stop pulse for indicating the number of decibels corresponding to the ratio of the reference voltage to a rectified IF signal voltage.

---

This invention relates to electronic measuring systems for measuring power, voltage or current in terms of the number of decibels equivalent to the ratio of the measured power, voltage, or current to a reference power, voltage or current, and more particularly to an electronic signal power measuring system for measuring signal power in the terms of the decibels equivalent to the ratio of a reference power to the signal power so as to provide a linear presentation of the input signal power ratios.

There is a frequent requirement in antenna and related arts for measuring signal power ratios in terms of the decibels equivalent to the ratios of a fixed reference power to the signal powers. This permits large signal power ratios differing by several or more orders of magnitude to be compressed to a convenient linear decibel scale. Accordingly, numerous attempts have been made in the past to provide signal power ratio measuring systems for forming ratios of a reference power to various signal powers and for converting the signal power ratios formed to their decibel equivalents as the signal is being received.

Some of these previous signal power ratio measuring systems have employed a potentiometer in a servo feedback loop. The output voltage of the potentiometer is an exponential function of the rotation of a shaft and the servo loop is arranged so that the rotation of the shaft is proportional to changes in signal level. The result of this arrangement is that changes in signal level cause a linear shaft rotation which defines the decibel equivalents of the changes. The disadvantage of this signal power ratio measuring system is that the logarithmic characteristic obtained is an approximation dependent upon the number of potentiometer taps employed. Moreover, the speed of response of the signal power ratio measuring system is limited by the speed of response of the servo loop. Thus, this signal power ratio measuring system has neither the speed of response nor the accuracy necessary to meet many of the requirements for measuring signal power ratios.

Various logarithmic amplifier circuits, attenuator circuits, and diode circuits have also been developed to meet the above described requirements for a signal power ratio measuring system. Signal power ratio measuring systems using these circuits have output level changes which are logarithmically proportional to ratios of different input signal powers. Thus, when the input to a signal power ratio measuring system employing one of these circuits is a reference power and a signal power in sequence, the change in output is logarithmically proportional to the ratio between the reference power and the signal power so as to define the decibel equivalent of this ratio. Signal power ratio measuring systems employing such circuits have high speeds of response. However, they possess the disadvantages of poor conformity of a logarithmic characteristic and of a variation in conformity to a logarithmic characteristic with temperature and circuit changes.

The wave guide beyond cut-off attenuator and the microwave rotary-vane attenuator have also been used in signal power ratio measuring systems. A wave guide beyond-cutoff attenuator signal power ratio measuring system utilizes a hollow tube excited at one end below its cutoff frequency and a coil or capacitor which picks up the attenuated field at the other end of the hollow tube. The field within the hollow tube falls off exponentially with distance from the exciting source and when the attenuation constant of the hollow tube is computed from the dimensions of the hollow tube, the attenuation introduced by the hollow tube expressed in decibels becomes a linear function of length along the hollow tube. The difficulty with signal power ratio measuring systems using the wave guide beyond-cutoff attenuator is that their speeds of response are relatively poor since the coil or capacitor which moves in the attenuated field within the hollow tube must be mechanically positioned.

The microwave rotary-vane attenuator is similar to the wave guide beyond-cutoff attenuator in that when used in a signal power ratio measuring system, the mechanical position of an element necessary to obtain an attenuated reference voltage equal to a signal voltage is used as an indication of the logarithm of the ratio of reference power to signal power. The mechanically positioned element when a microwave rotary-vane attenuator is used in a signal power measuring system is the attenuating vane which is rotated to attenuate the reference voltage and as with signal power ratio measuring systems utilizing the wave guide beyond-cutoff attenuator, signal power ratio measuring systems utilizing the microwave rotary-vane attenuator possess the disadvantage of poor speed of response because of the mechanical positioning of the attenuating vane. Moreover, signal power ratio measuring systems utilizing the microwave rotary-vane attenuator possess the further disadvantage that attenuation by the vane is not linearly related in decibels to the rotation of the shaft by which the vane is positioned. Thus, a translator is necessary to obtain a logarithmic characteristic from shaft rotation.

From the foregoing, it can be seen that previous signal power ratio measuring systems have been characterized by either poor response times or the lack of precision. The signal power ratio measuring system disclosed herein is a completely electronic system which overcomes these and other limitations of previous systems for measuring signal powers in terms of the decibels equivalent to the ratios of a reference power to the signal powers. With the present invention, signal power ratios are obtained in terms of the decibels equivalent to their ratios with a reference power in a rapid and highly accurate fashion which permits signal power ratios to be rapidly and accurately determined.

The signal power ratios are ratios of a constant reference power to various signal powers and each ratio is rapidly and accurately determined in terms of equivalent decibels by utilizing the decaying voltage envelope of a pulsed LCR circuit. The voltage envelope of the LCR circuit decays from a fixed initial reference voltage in an exponential fashion and the signal voltage envelope is compared with the exponentially decaying voltage envelope of the LCR circuit to determine the time required for the initial reference voltage to decay to a reduced reference voltage having the same amplitude as the signal voltage. Since this decay time is linearly proportional to the logarithm of the ratio of the initial reference voltage to the reduced reference voltage and since the reduced reference voltage is equal to the signal voltage, the decay time is linearly proportional to the logarithm of the ratio of the initial reference voltage to the signal voltage.

The logarithm of the ratio of the initial reference voltage to the signal voltage is directly related to the number of decibels equivalent to the signal power ratio of a reference power having a voltage equal to the initial reference voltage to a signal power corresponding to the signal voltage. Thus, in the present signal power ratio measuring system, the time required for the voltage in an LCR circuit to decay from an initial reference voltage to a reduced reference voltage equal to a signal voltage is representative of a signal power in terms of the decibels equivalent to the ratio of a reference power to the signal power.

The signal power ratio measuring system disclosed herein utilizes the linear relationship between time and signal power ratio to provide an analog or digital presentation of the number of decibels equivalent to each ratio of a reference power to a signal power by making the analog or digital presentation a function of time. Thus, it will be seen that the present signal power ratio measuring system comprises an LCR circuit for generating a voltage envelope which exponentially decays from a fixed initial reference voltage, means for comparing a signal voltage with the exponentially decaying voltage envelope of the LCR circuit, means for determining the time required for the LCR voltage envelope to decay from the initial reference voltage to a reduced reference voltage equal to the signal voltage, and means responsive to the decay time for indicating the number decibels equivalent to the signal power ratio which the decay time represents.

It will be readily apparent that the present signal power ratio measuring system requires no mechanical positioning of shafts, vanes or probes and that it can be implemented in its entirety by various electronic circuits. As a result, the present signal power ratio measuring system rapidly provides a measurement of signal power ratios in terms of the decibels equivalent to the ratio of a reference power to the signal power. Moreover, the present signal power ratio measuring system can be implemented by circuitry which will result in the decibels equivalent to various signal power ratios being obtained in a highly accurate fashion.

These and other features and advantages of the invention will be more clearly understood from the following detailed description and the accompanying drawings in which like characters of reference designate corresponding parts in all figures and in which.

These figures and the following detailed description disclose a preferred specific embodiment of the invention but the invention is not limited to the details disclosed since it may be embodied in other equivalent forms.

Figure 1:
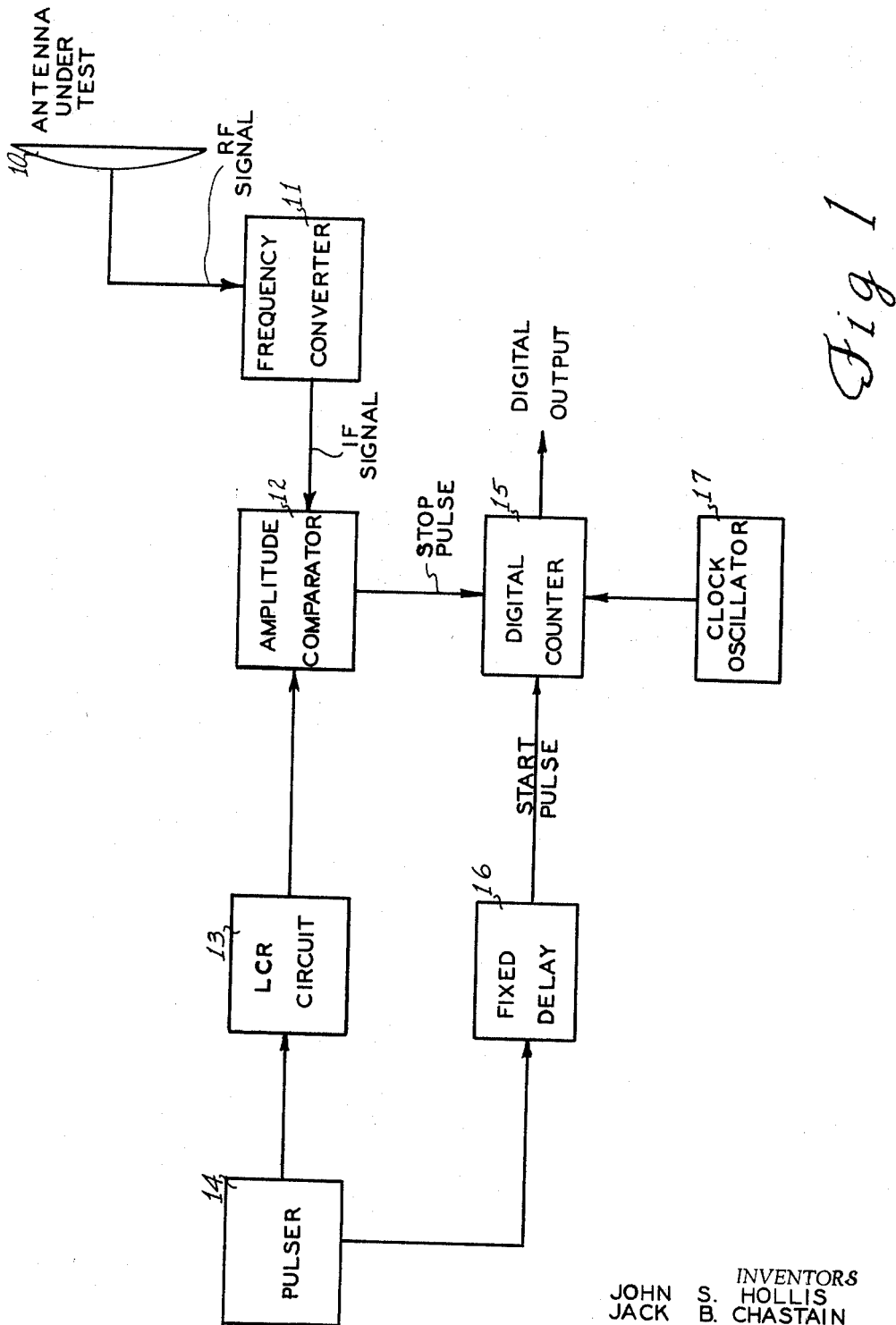
FIG. 1 is a simplified circuit block diagram of the signal power ratio measuring system.

The signal power ratio measuring system disclosed herein is best understood by first considering the simplified circuit diagram shown in FIG. 1. In the signal power ratio measuring system as shown in FIG. 1, the radio frequency signal from an antenna 10 or a related device is fed to a frequency converter 11 in which the radio frequency signal is converted to a corresponding intermediate frequency signal in known manner. The intermediate frequency signal has a maximum or envelope voltage $V_s$ which is proportional to the maximum or envelope voltage of the radio frequency signal fed to the frequency converter 11. Thus, this intermediate frequency voltage $V_s$ is representative of the signal power of the radio frequency signal and it is fed to an amplitude comparator 12 as a signal voltage $V_s$ corresponding to a particular signal power.

The output of a pulsed LCR circuit 13 is also fed to the amplitude comparator 12. The LCR circuit 13 is pulsed by a pulser 14 and after each pulse, the LCR circuit decays exponentially from a fixed initial reference voltage $V_R$. It is the initial reference voltage $V_R$ and the envelope of its exponential decay which are fed to the amplitude comparator 12.

As the initial reference voltage $V_R$ decays exponentially, the reduced reference voltage $V_E$ at time T is defined by the equation:

$$V_E = V_R \epsilon^{-\omega_0 T/2Q} \qquad (1)$$

Those skilled in the art will recognize Equation 1 as the equation for the instantaneous amplitude of the decaying voltage envelope of a sine wave which results when a series LCR circuit having a high Q has been pulse-excited at its resonant frequency $\omega_0 = 1/(LC)^{1/2}$. This can be shown by the following differential equation for the instantaneous voltage in a series LCR circuit at time $t$ following time $t_0$ at which the voltage is $V_R$:

$$L\,di/dt + (1/C)\int i\,dt + Ri = U(t)\,V_R \sin \omega_0 t - U(t - t_0) V_R \sin \omega_0 t$$

U is the unit step convention known to those skilled in the art and when this differential equation is solved for $t$ greater than $t_0$ in conventional manner with $\omega_0 > R/2L$ for an LCR circuit with a high Q and with $Rt_0/2L \geq 10$ so that $t_0$ is after the initial charging transients have substantially decayed, the following equation for instantaneous current is obtained using $\omega_0 L/R = Q$:

$$i(t) = \frac{V_R}{R} \epsilon^{-\omega_0(t-t_0)/2Q}[\sin \omega_0 t - (1/2Q) \sin \omega_0 t_0 \sin \omega_0 (t - t_0)]$$

With Q considered to be equal to or greater than 1000 and since $Ri(t)$ is the voltage $V_E$ of Equation 1, this instantaneous current equation can be written in terms $V_E$ by multiplying both sides by R and eliminating terms made insignificant by the value of Q as:

$$V_E = V_R \epsilon^{-\omega_0 T/2Q} \sin \omega_0 t$$

where T equals $t - t_0$. Thus, as indicated above, it will be seen that Equation 1 is simply the equation for the instantaneous voltage of the decaying voltage envelope of a sine wave having the resonant frequency, $\omega_0$, of the LCR circuit 13.

When Equation 1 is solved for time T the following equation is obtained:

$$T = \left[\frac{2Q}{\omega_0 \log \epsilon}\right] \log \left(\frac{V_R}{V_E}\right) \qquad (2)$$

It will be seen from Equation 2 that the time required for the voltage envelope fed to the amplitude comparator 12 from the LCR circuit 13 to decay from the initial reference voltage $V_R$ to the reduced reference voltage $V_E$ is linearly proportional to the logarithm of the ratio $V_R/V_E$. The amplitude comparator 12 is arranged to feed a stop pulse to a digital counter 15 when the reduced reference voltage $V_E$ fed to the amplitude comparator 12 from the LCR circuit 13 equals the signal voltage $V_s$ fed to the amplitude comparator 12 from the frequency converter 11. This stop pulse to the digital counter 15 terminates time T for the purposes of Equation 2 and since the stop pulse is fed to the digital counter 15 when the reduced reference voltage $V_E$ equals the signal voltage $V_s$, $V_s$ can be substituted for $V_E$ in Equation 2 to provide:

$$T = \left[\frac{2Q}{\omega_0 \log \epsilon}\right] \log \left(\frac{V_R}{V_s}\right) \quad (3)$$

As a result of this substitution of signal voltage $V_s$ for reduced reference voltage $V_E$ because of the action of the amplitude comparator 12, time T becomes linearly proportional to the logarithm of the ratio of the fixed initial reference voltage $V_R$ to the signal voltage $V_s$.

The decibel equivalent of the signal power ratio of a reference power represented by the initial reference voltage $V_R$ to a signal power represented by a signal voltage $V_s$ is expressed as follows:

$$\text{Decibels} = 20 \log \frac{V_R}{V_s} \quad (4)$$

When Equations 3 and 4 are considered together it becomes apparent that:

$$T = \left[\frac{2Q}{\omega_0 \log \epsilon}\right]\left(\frac{\text{decibels}}{20}\right) \quad (5)$$

Thus, from Equation 5 it will be understood that time T is linearly proportional to the decibel equivalent of a signal power ratio of a reference power represented by the initial reference voltage $V_R$ to a signal power represented by a signal voltage $V_s$.

A start pulse is fed to the digital counter 15 through a fixed delay 16. The start pulse is fed from the pulser 14 and corresponds in timing to the pulsing of the LCR circuit 13 by the pulser 14. The fixed delay 16 serves to delay the arrival of the start pulse at the digital counter 15 until the initial transient effects resulting from the pulsing of the LCR circuit have passed and the voltage envelope being fed to the amplitude comparator 12 from the LCR circuit 13 is decaying in exponential manner. The initial reference voltage $V_R$ is the voltage of the exponentially decaying envelope corresponding to the arrival of the start pulse at the digital counter 15 and the fixed time delay 16 serves to insure that both the initial reference voltage $V_R$ and the reduced reference voltage $V_E$ are on the exponentially decaying portion of the voltage envelope fed to the amplitude comparator 12 from the LCR circuit 13. Thus, the time T of Equation 5 is the time interval between the arrival at the digital counter 15 of the start pulse from the fixed time delay 16 and the arrival at the digital counter 15 of the stop pulse from the amplitude comparator 12.

The digital counter 15 counts the cycles of a clock oscillator 17 which occur between the start pulse and the stop pulse. The frequency of the clock oscillator 17 and the parameters of the LCR circuit 13 are selected to result in the digital counter 15 directly indicating the number of decibels corresponds to each time T as established by the linear relationships shown in Equation 5. It will be seen from the foregoing that the signal power ratio measuring system disclosed herein uses the time T required for an initial reference voltage $V_R$ to exponentially decay to the same amplitude as a signal voltage $V_s$ as an indication of signal power in terms of the decibels equivalent to the signal power ratio which corresponds to $V_R/V_s$. It will also be seen that the equivalent decibels are provided in a rapid manner and it will be understood that the time T may be used not only to control a digital counter 15, but also as the control for an arrangement to feed a computer or to graphically record the decibels represented by time T. Such arrangements are not shown since they will be obvious once the relationship between time T and the voltages $V_R$ and $V_s$ is understood.

Figure 2:
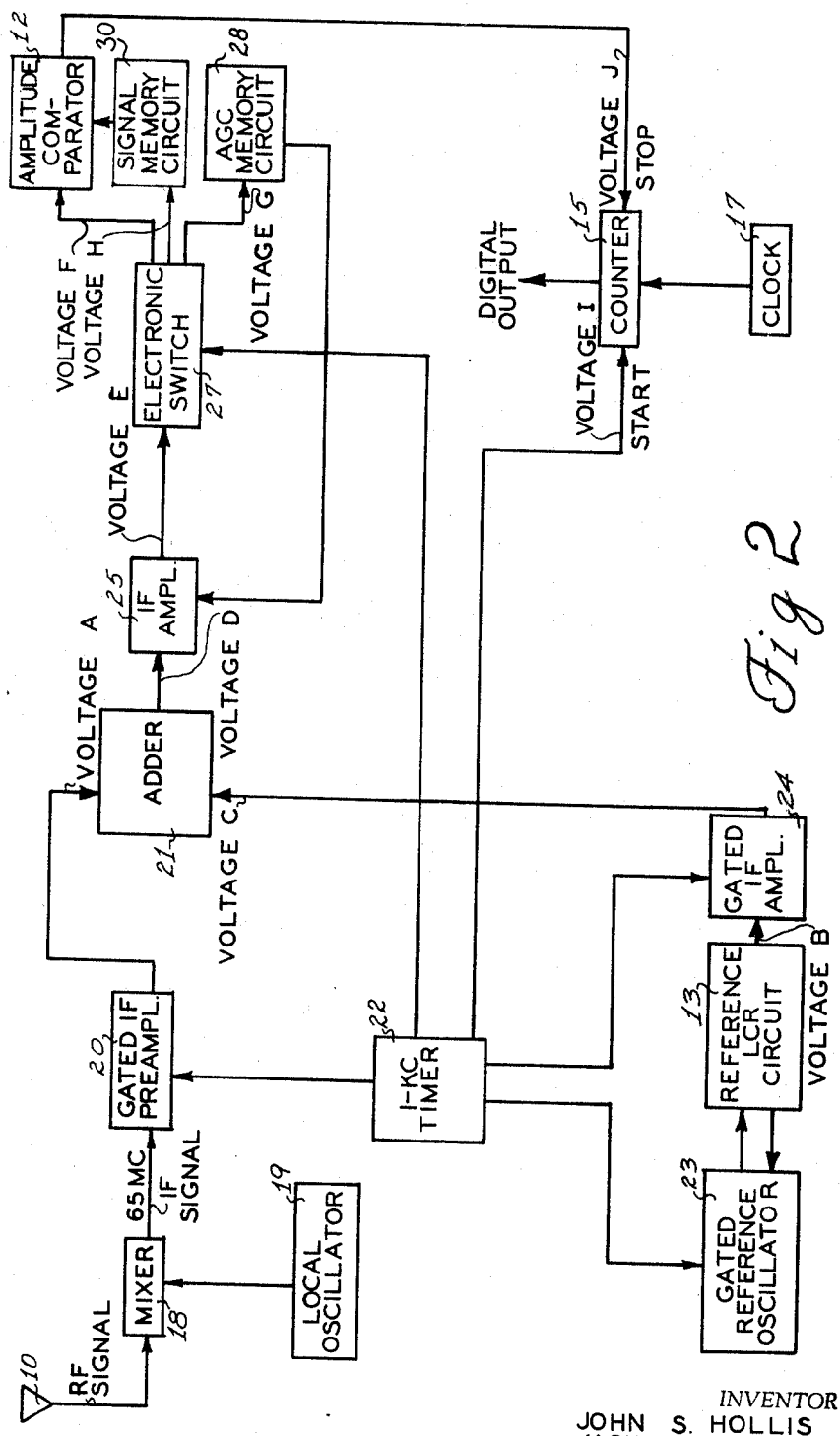
FIG. 2 is a circuit block diagram showing one embodiment of the signal power ratio measuring system in detail.

Moreover, once the signal power ratio measuring system disclosed herein is understood from the simplified circuit diagram shown in FIG. 1, it may be implemented in a variety of embodiments using a variety of circuit arrangements. One circuit by which the system may be implemented is shown in FIG. 2 in which it will be seen that the radio frequency signal from an antenna 10 is converted to an intermediate frequency signal by the heterodyne action of a mixer 18 and a local oscillator 19. In the specific embodiment of the invention shown in FIG. 2, the intermediate frequency signal voltage $V_s$ has a frequency of sixty-five megacycles and is fed through a gated IF preamplifier 20 to an adder 21. The IF preamplifier 20 is gated at a one kilocycle rate by pulses from a timer 22 and the gating of the IF preamplifier 20 by the timer 22 serves to cause the signal voltage $V_s$ to be fed to the adder 21 as a series of sixty-five megacycle pulses separated by time intervals B equal in length to the time interval A of each pulse as shown by voltage A in FIG. 4.

The timer 22 also pulses a gated reference oscillator 23 whose frequency is controlled by the LCR circuit 13. In the specific embodiment of the invention shown in FIG. 2, the resonant frequency of the LCR circuit 13 is sixty-five megacycles. The gated reference oscillator 23 is a sixty-five megacycle cathode-coupled oscillator and the LCR circuit 13 is connected as the frequency control element of the gated reference oscillator 23. The timing of the pulses to the gated reference oscillator 23 from the timer 22 is such that sixty-five megacycle energy is stored in the LCR circuit 13 just prior to the ends of the time intervals A in which the signal voltage $V_s$ is permitted to pass the IF preamplifier 20. The result is that the LCR circuit 13 generates a sixty-five megacycle voltage envelope which exponentially decays during those time intervals B between the time intervals A occupied by the output of the signal voltage $V_s$ from the IF preamplifier 20 as shown by voltage B in FIG. 4.

Figure 4:
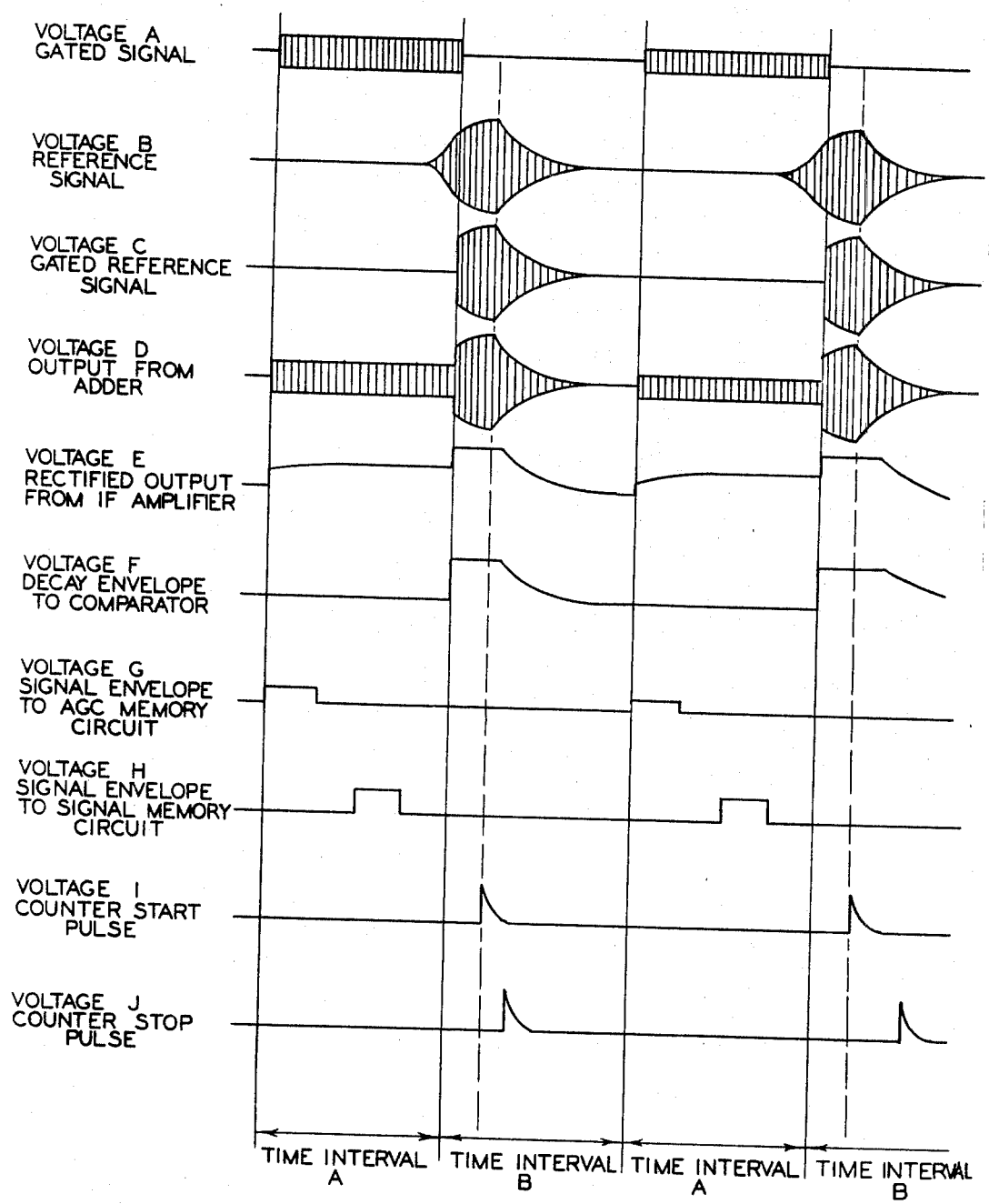
FIG. 4 is a schematic presentation of the voltages at various indicated points in the signal power ratio measuring system shown in FIG. 2.

The output of the LCR circuit 13 is fed to the adder 21 through a gated IF amplifier 24 which is gated by the timer 22 to permit only that portion of the exponentially decaying voltage envelope generated by the LCR circuit 13 in a time interval B to arrive at the adder 21 as shown by voltage C in FIG. 4. Thus, the input to the adder 21 is alternately the signal voltage $V_s$ and an exponentially decaying voltage envelope from the LCR circuit 13. The output of the adder 21 is shown by voltage D in FIG. 4 and consists of the signal voltage $V_s$ in time intervals A separated in time by the exponentially decaying voltage envelopes in time intervals B.

Both the signal voltages $V_s$ in time intervals A and the exponentially decaying voltage envelopes in time intervals B have a frequency of sixty-five megacycles and the output of the adder 21 is fed to a sixty-five megacycle IF amplifier and detector 25. The detected output of the IF amplifier 25 is fed to an electronic switch 27 which is responsive to the timer 22 so as to feed the detected output of the IF amplifier 25 to the amplitude comparator 12 during time intervals B, to an AGC memory circuit 28 during the first portion of each time interval A, and to a signal memory circuit 30 during the second portion of each time interval A. The result is that the amplitude comparator 12 is repeatedly fed exponentially decaying voltage envelopes and the AGC memory circuit 28 and the signal memory circuit 30 are repeatedly fed segments of signal voltage $V_s$.

The detected output of the IF amplifier 25 fed to the AGC memory circuit 28 during the first portion of each time interval A is shown as voltage G in FIG. 4 and is a signal pulse having the amplitude of the signal voltage $V_s$. The output of the AGC memory circuit 28 is responsive to the signal pulse fed to the AGC memory circuit 28 during the first portion of each time interval A and serves to fix the gain of the IF amplifier 25 for the remainder of the time interval A and for the time interval B following the time interval A. The gain of the IF amplifier 25 is fixed by the output of the AGC memory circuit 28 to amplify the signal voltage $V_s$ for the remainder of the time interval A to a fixed level regardless of the amplitude of the signal voltage $V_s$ prior to the IF amplifier 25. Since the gain of the IF amplifier 25 is fixed for the time interval B following time interval A the IF amplifier 25 also serves to amplify the exponentially decaying voltage envelope in the time interval B following the time interval A to the same extent as the signal voltage $V_s$ in the remainder of the preceding time interval A.

The result of the AGC memory circuit 28 output to the IF amplifier 25 is that the detected output of the IF amplifier 25 during each time interval A is an amplified and detected output having a first portion in which the signal voltage $V_s$ has an amplitude dependent upon the amplitude of the signal voltage $V_s$ fed to the IF amplifier 25 and a second portion in which the signal voltage $V_s$ is amplified to a fixed amplitude by the action of the AGC memory circuit 28 so as to provide signal voltages $V_s$ in successive time intervals A of substantially identical amplitudes. The output of the IF amplifier 25 during each time interval B is the exponentially decaying voltage envelope fed to the IF amplifier 25 amplified by the action of the AGC memory circuit 28 to the same extent as the signal voltage $V_s$ in the second portion of the preceding time interval A.

The electronic switch 27 feeds the output of the IF amplifier 25 during the second portion of each time interval A to the signal memory circuit 30 as a pulse of signal voltage $V_s$. The pulses of signal voltage $V_s$ fed to the signal memory circuit 30 during the time intervals A are shown as voltage H in FIG. 4 and it will be understood that the pulses of signal voltage $V_s$ fed to the signal memory circuit 30 during successive time intervals A by the electronic switch 27 all have substantially the same amplitude. The detected exponentially decaying voltage envelopes fed during the time intervals B to the amplitude comparator 12 by the electronic switch 27 are shown as voltage F in FIG. 4.

As shown by voltage F in FIG. 4, the saturation of the IF amplifier 25 limits the maximum amplitude of the exponentially decaying voltage envelopes fed to amplitude comparator 12. Thus, only that portion of an exponentially decaying voltage envelope having amplitudes less than this maximum amplitude appears in a time interval B and the differences in amplification of the exponentially decaying voltage envelopes are reflected by the point in a time interval B at which the exponentially decaying voltage envelope appears and by the portion of an exponentially decaying voltage envelope which appears. The greater the amplification of the exponentially decaying voltage envelope by the IF amplifier 25, the later the exponentially decaying voltage envelope appears in the time interval B and the further along a curve of exponential decay is the voltage envelope which appears. Accordingly, it will be understood that the greater the gain set by the AGC memory circuit 28 during a time interval A in order to obtain a signal voltage $V_s$ pulse having a fixed amplitude, the later the appearance of a reduced reference voltage $V_E$ equal to the signal voltage $V_s$ in the time interval B following the time interval A.

It will also be understood that this arrangement of amplifying each signal voltage $V_s$ fed to the signal memory circuit 30 to a fixed amplitude and of amplifying the exponentially decaying voltage envelope in each time interval B fed to the amplitude comparator 12 to the same extent as the signal voltage $V_s$ in the second portion of the preceding time interval A is functionally equivalent to feeding substantially identical exponentially decaying voltage envelopes to the amplitude comparator 12 in successive time intervals B and feeding signal voltages $V_s$ of varying amplitude to the signal memory circuit 30 and has the added and important advantage of providing equal sensitivity of the measured time delay to given changes in the signal power ratios at all signal power levels accommodated by the signal power ratio measuring system. This functional equivalence is because the time T required for an exponentially decaying voltage envelope to reach a reduced reference voltage $V_E$ equal to a signal voltage $V_s$ will be the same if the exponentially decaying voltage envelope from the LCR circuit 13 and the signal voltage $V_s$ are not amplified, are continuously amplified in succeeding time intervals A and B to the same extent, or are amplified in a time interval A and the immediately succeeding time interval B to that level necessary to bring the signal voltage $V_s$ in each time interval A to a constant level.

The advantage of the circuit arrangement shown in FIG. 2 is that the pulse of signal voltage $V_s$ fed to the signal memory circuit 30 in each time interval A and the exponentially decaying voltage envelope fed to the amplitude comparator 12 in the time interval B following the time interval A are always amplified to the same extent and the amplification never exceeds that required to amplify a relatively weak signal voltage $V_s$ to the fixed amplitude. The limiting of the amplification by the IF amplifier 25 insures that the signal voltages $V_s$ and the exponentially decaying voltage envelopes are amplified at substantially the same point on the linearity curve of the IF amplifier 25 and substantially eliminates the possibility of error being introduced into the signal power measuring system disclosed herein by non-linear output from the detector of IF amplifier 25.

The signal memory circuit 30 maintains the signal voltage $V_s$ fed to it as pulse from the IF amplifier 25 by the electronic switch 27 for the duration of the time interval B following the time interval A in which the pulse of signal voltage $V_s$ is fed to the signal memory circuit 30. The signal voltage $V_s$ maintained during the time interval B by the signal memory circuit 30 is fed to the amplitude comparator 12 and it is this signal voltage $V_s$ fed to the amplitude comparator 12 from the signal memory circuit 30 which the amplitude comparator 12 compares with the exponentially decaying voltage envelope fed to the amplitude comparator 12 from the IF amplifier 25 by the electronic switch 27 during the time interval B. When the voltage envelope fed to the amplitude comparator 12 during a time interval B decays to a reduced reference voltage $V_E$ equal to the signal voltage $V_s$ being maintained by the signal memory circuit 30 and fed to the amplitude comparator 12 by the signal memory circuit 30, the amplitude comparator 12 generates a stop pulse which is fed to the digital counter 15.

The start pulse to the digital counter 15 is fed from the timer 22 and the timer 22 is arranged to provide the time delay necessary to insure that the stop pulse is not fed to the digital counter 15 until the exponential character of the exponentially decaying voltage envelope has been established and the voltage of the decaying voltage envelope in the amplitude comparator 12 is the initial reference $V_R$ as amplified in amplifier 25 as determined by the action of the AGC memory circuit 28. It will be understood that the start pulse is fed to the digital computor 15 from the timer 22 at the same point in each time interval B as shown by voltage I in FIG. 4, and that as shown by voltage J in FIG. 4, the stop pulse will be fed to the digital counter 15 from the amplitude comparator 12 at a point in each time interval B dependent upon the amplification of the exponentially decaying voltage envelope resulting from the action of AGC memory circuit 28. As described above, the comparison of signal voltages $V_s$ having fixed amplitudes with exponentially decaying voltage envelopes amplified in inverse relationship to the amplitudes of the signal voltages $V_s$ prior to the IF amplifier 25 is functionally equivalent to comparing signal voltages $V_s$ of varying amplitudes with exponentially decaying voltage envelopes of fixed amplitude. Thus, the time interval between a start pulse and a stop pulse in a time interval B is equivalent to the time T required for an exponentially decaying voltage envelope to decay from an initial reference voltage $V_R$ to a reduced reference voltage $V_E$ equal to the signal voltage $V_s$.

Therefore, as with the simplified circuit of FIG. 1, the circuit of FIG. 2 provides a start pulse to the digital counter 15 which corresponds to an initial reference voltage $V_R$ in the amplitude comparator 12 and a stop pulse which corresponds to a reduced reference voltage $V_E$ in the amplitude comparator 12 equal to the signal voltage $V_s$. The time interval T between the start and stop pulses is linearly related to the decibels equivalent to a signal power ratio defined by $V_R/V_s$.

In the specific embodiment of the signal power ratio measuring system shown in FIG. 2, the clock oscillator 17 drives the digital counter 15 at a twenty megacycle rate and the digital counter 15 will advance twenty units in each microsecond between a start pulse and a stop pulse. The parameters of the LCR circuit 13 are selected to provide a loaded Q of 8875 at a frequency of sixty-five megacycles. This results in the time T being three hundred microseconds when the decibels in Equation 5 are sixty and in each microsecond between start and stop pulses to the digital counter 15 corresponding to twenty-hundredths of a decibel because of the linear relationship between time T and decibels expressed by Equation 5. The frequency selected for the clock oscillator 17 causes the digital counter 15 to advance twenty units in each microsecond and when these units are read as hundredths of a decibel, the digital counter 15 directly indicates a signal power in terms of the decibels equivalent to the ratio of a reference power to the signal power.

Figure 3:
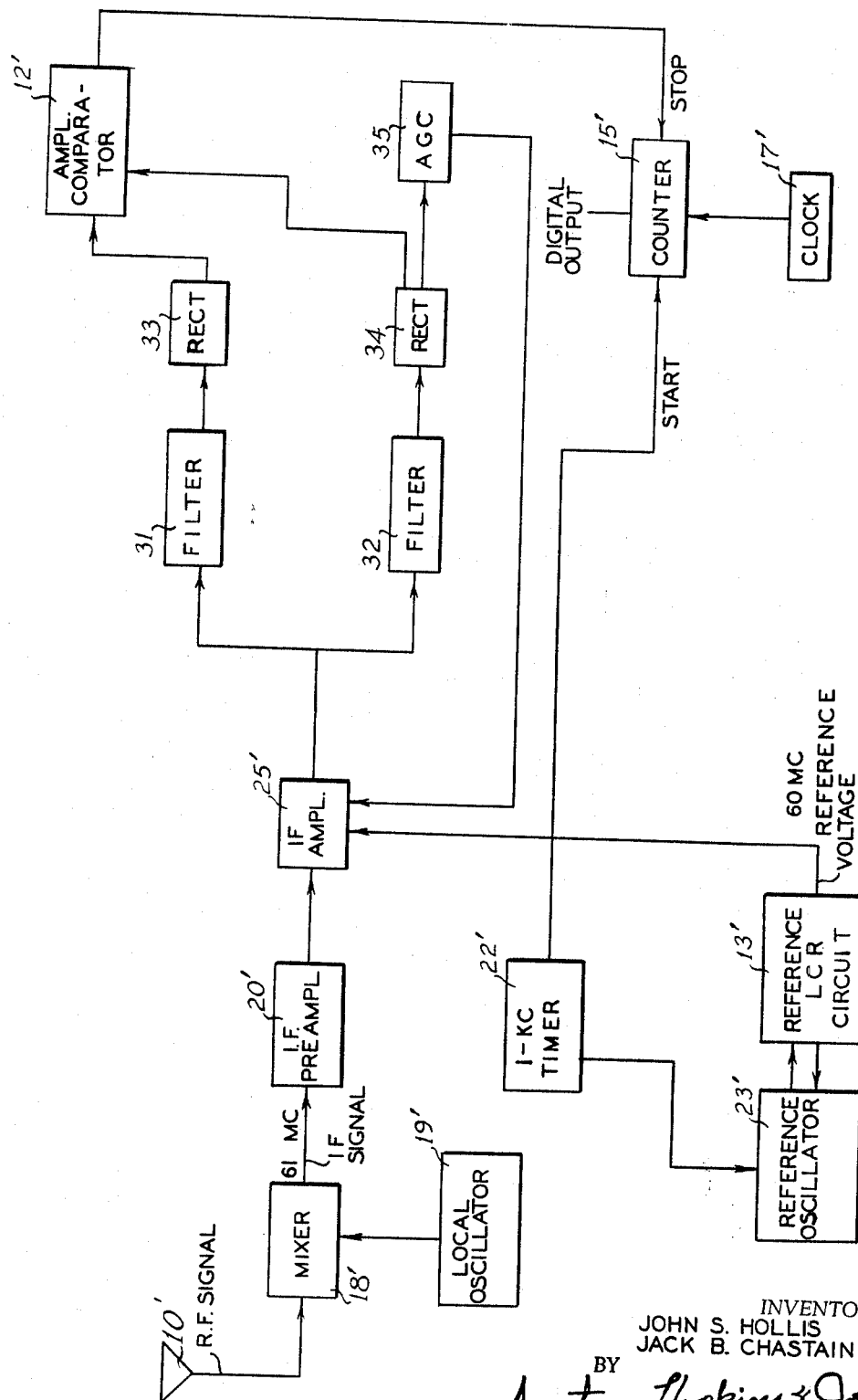
FIG. 3 is a circuit diagram showing a second embodiment of the signal power ratio measuring system.

In FIG. 3 is shown a second embodiment of the signal power measuring system disclosed herein in which the radio frequency signal from an antenna or a related device 10' is converted to an intermediate frequency signal by the heterodyne action of a mixer 18' and a local oscillator 19' and in which the intermediate frequency signal voltage $V_s$ is continuously fed through IF preamplifier 20' to an IF amplifier 25'. A timer 22' pulses a reference oscillator 23' which in response to pulsing by the timer 22' pulses an LCR circuit 13'. The output of the LCR circuit 13' is continuously fed is a series of exponentially decaying voltage envelopes to the IF amplifier 25'.

In this embodiment of the invention disclosed herein, the LCR circuit 13' generates an exponentially decaying voltage envelope having a frequency different from the intermediate frequency of the signal voltage $V_s$ fed to the IF amplifier 25'. In the specific embodiment of the invention shown in FIG. 3, the frequency of the signal voltage $V_s$ is sixty-one megacycles and the resonant frequency of the LCR circuit 13' is sixty megacycles. Thus, in the second embodiment of the invention shown in FIG. 3, the IF amplifier 25' is continuously fed a signal voltage $V_s$ having a frequency of sixty-one megacycles and an amplitude directly related to signal power and a series of exponentially decaying sixty megacycle voltage envelopes.

The IF amplifier 25' of the embodiment of the invention shown in FIG. 3 is a wide band IF amplifier of known type which linearly amplifies the frequencies of both the signal voltage $V_s$ and the exponentially decaying voltage envelopes. The output of the IF amplifier 25' is the summation of the signal voltage $V_s$ and the series of exponentially decaying voltage envelopes fed to the IF amplifier 25' from the LCR circuit 13'. This output of the IF amplifier 25' is fed to a filter 31 and a filter 32. The filter 31 is selected to pass only sixty megacycles and the filter 32 is selected to pass only sixty-one megacycles. As a result, the filter 31 will not pass the sixty-one megacycle signal voltage $V_s$ component of the IF amplifier 25' output and the output of the filter 31 is the exponentially decaying voltage envelopes from the LCR circuit 13' as amplified by the IF amplifier 25'. Similarly, the filter 32 will not pass the sixty megacycle exponentially decaying voltage envelope component of the IF amplifier 25' output and the output of the filter 32 is the sixty-one megacycle signal voltage $V_s$ as amplified by the IF amplifier 25'.

The output of the filter 31 is rectified by a rectifier 33 and fed to the amplitude comparator 12' as a continuous series of amplified and rectified exponentially decaying voltage envelopes. The output of the filter 32 is rectified by a rectifier 34 and is fed to the amplitude comparator 12' as a continuous amplified and rectified signal voltage $V_s$. The rectifier 34 also has an output to an AGC circuit 35 which controls the gain of the IF amplifier 25' so as to maintain the amplitude of the signal voltage $V_s$ fed to the amplitude comparator 12' at a fixed level. As with the specific embodiment of the invention shown in FIG. 2, this action of the AGC circuit 35 results in exponentially decaying voltage envelopes which have been amplified to an extent dependent upon the amplification of the signal voltage $V_s$ provided by the AGC circuit 35. Thus, as in the specific embodiment of the invention shown in FIG. 2, the amplitude comparator 12' is provided with signal voltages $V_s$ having a fixed amplitude and a series of exponentially decaying voltage envelopes which decay to a reduced reference voltage $V_E$ equal to the fixed amplitude of the signal voltage $V_s$ in varying times T dependent upon their amplification as a result of the AGC action of the AGC circuit 35.

It will be understood that the timer 22' in the specific embodiment of the invention shown in FIG. 3 initiates a start pulse in the same manner as the timer 22 shown in FIG. 2 and that a stop pulse is initiated each time an exponentially decaying voltage envelope decays to a reduced reference voltage $V_E$ equal to the signal voltage $V_s$ in the amplitude comparator 12'. The time T between start and stop pulses is linearly related to the decibels equivalent to a signal power ratio defined by $V_R/V_s$ and as in the specific embodiment of the invention shown in FIG. 2, this time interval T is used by a digital counter 15' and a clock oscillator 17' to directly indicate signal power in terms of the decibels equivalent to the ratio of a reference power to the signal power.

It will be seen that the signal power ratio measuring system of the present invention provides for a direct indication of signal power ratios in terms of the decibels equivalent to the ratio of a reference power to the signal reference power at a highly rapid rate because there is no mechanical positioning of shafts, vanes or the like. Moreover, because the decaying voltage envelope used as a reference voltage and the signal voltage $V_s$ are both amplified by the same IF amplifier and because the amplification of the IF amplifier 24 is controlled by the AGC memory circuit 28 to insure linear amplification of both a signal voltage $V_s$ and the exponentially decaying voltage envelope with which it is compared, a high degree of accuracy is obtained.

It will be obvious to those skilled in the art that many variations may be made in the embodiments chosen for the purpose of illustrating the present invention without departing from the scope thereof as defined by the appended claims.

What is claimed is:

1. A system for measuring the signal power of an RF signal in terms of the decibels equivalent to the signal power ratio of a reference power to the signal power, said system comprising, in combination, a voltage source having as an output a voltage envelope which decays exponentially during each of a plurality of first time intervals separated by a plurality of second time intervals; a frequency converter for converting the RF signal to an IF signal during each of the plurality of second time intervals separated by the plurality of first time intervals; first circuit means for combining the output of the voltage source and the output of the frequency converter on a time sharing basis so as to form a composite voltage envelope having the output of the voltage source in each of the plurality of first time intervals and an IF signal voltage in each of the second time intervals which separate the first time intervals; second circuit means for amplifying and rectifying the composite voltage envelope to provide in each first time interval a rectified voltage envelope which decays exponentially from a first reference voltage with a particular relationship to the reference power and in each second time interval a rectified signal voltage with the same particular relationship to the signal power as the first reference voltage has to the reference power; start means for initiating a start pulse during each first time interval at a point on the slope of the decaying rectified voltage envelope at which the voltage is the first reference voltage; comparator means for comparing the rectified voltage envelope in each first time interval with the rectified signal voltage in the preceding second time interval and for initiating during each first time interval a stop pulse when the voltage of the rectified voltage envelope is equal to the rectified signal voltage; and means responsive to the time interval between the start pulse and the stop pulse for indicating the number of decibels corresponding to a signal power ratio defined by the ratio of the first reference voltage to the rectified signal voltage.

2. A system for measuring the signal power of an RF signal in terms of the decibels equivalent to the signal power ratio of a reference power to the signal power, said system comprising, in combination, a voltage source having as an output a voltage envelope which decays exponentially during each of a plurality of first time intervals separated by a plurality of second time intervals; a frequency converter for converting the RF signal to an IF signal during each of the plurality of second time intervals separated by the plurality of first time intervals; first circuit means for combining the output of the voltage source and the output of the frequency converter so as to form a composite voltage envelope having the output of the voltage source in each of the plurality of first time intervals and an IF signal in each of the second time intervals which separate the first time intervals; second circuit means for amplifying and rectifying the composite voltage envelope to provide in each first time interval a rectified voltage envelope which decays exponentially from a first reference voltage with a particular relationship to the reference power and in each second time interval a rectified signal voltage with the same particular relationship to the signal power as the first reference voltage has to the reference power; control means responsive to the IF signal for controlling the amplification of the second circuit means to provide the same amplification during a first time interval and the particular second time interval preceding the said first time interval, said amplification being set to provide substantially the same rectified signal voltage in every second time interval; start means for initiating a start pulse during each first time interval at a point on the slope of the decaying rectified voltage envelope at which the voltage is the first reference voltage; comparator means for comparing the rectified voltage envelope in each first time interval with the rectified signal voltage in the preceding second time interval and for initiating during each first time interval a stop pulse when the voltage of the rectified voltage envelope is equal to the rectified signal voltage; and means responsive to the time interval between the start pulse and the stop pulse for indicating the number of decibels corresponding to a signal power ratio defined by the ratio of the first reference voltage to the rectified signal voltage.

3. A system for measuring the signal power of an RF signal in terms of the decibels equivalent to the signal power ratio of a reference power to the signal power, said system comprising a frequency converter for converting the RF signal to an IF signal having a particular intermediate frequency; a reference circuit having an output when pulsed which has a frequency substantially equal to the said particular intermediate frequency and a voltage envelope which exponentially decays; first circuit means for combining the IF signal and the output of the reference circuit so as to obtain a composite signal having the said IF signal in a plurality of signal time intervals and the output of the reference circuit in a plurality of reference time intervals alternating with the signal time intervals; second circuit means for amplifying and rectifying the composite signal so as to provide an amplified and rectified output having the amplified and rectified IF signal in the said signal intervals and the amplified and rectified output of the reference circuit in the reference time intervals, the said second circuit means being tuned to the said particular intermediate frequency and the amplification of the said second circuit means being responsive to a gain control input; sorting means for dividing the amplified and rectified output of the second circuit means into a first output having the amplified and rectified output of the reference circuit removed from the reference time intervals and a second output having the amplified and rectified IF signal removed from the signal time intervals; gain control means responsive to the IF signal for providing a gain control input to the second circuit means during a signal time interval and the following reference time interval; signal sustaining means responsive to the first output of the sorting means for providing an output during each reference time equal to the first output of the sorting means during each signal time interval; comparator means for comparing the second output of the second circuit means with the output of the signal sustaining means and initiating a stop pulse when the voltage of the said second output equals the output of the signal sustaining means; start means for initiating a start pulse when the voltage of the second output of the second circuit means corresponds to an initial reference voltage; indicating means responsive to the said start pulse and the said stop pulse for indicating the decibels equivalent to a signal power ratio defined by the ratio of the initial reference voltage to the output of the signal sustaining means.

4. A system for measuring the signal power of an RF signal in terms of the decibels equivalent to the signal power ratio of a reference power to the signal power, said system comprising a frequency converter for converting the RF signal to an IF signal having a first intermediate frequency; a first circuit means having an output which has a second intermediate frequency different from the said first intermediate frequency and a voltage envelope that exponentially decays; an amplifying means for simultaneously amplifying the IF signal and the output of the first circuit means to provide an output which is the amplified summation of the IF signal and the output of the first circuit means, said amplifying means being tuned to amplify both the first intermediate frequency and the second intermediate frequency; a first filtering means for receiving the output of the amplifying means and having an output with only the first intermediate frequency; a second filtering means for receiving the output of the amplifying means and having an output with only the second intermediate frequency; a first rectifying means for rectifying the output of the first filtering means to provide a rectified output; a second rectifying means for rectifying the output of the second filtering means to provide a rectified output; means responsive to the IF signal for adjusting the gain of the amplifying means so that the rectified output of the first rectifying means remains at a constant level; comparator means for comparing the output of the first rectifying means and the output of the second rectifying means and initiating a stop pulse when the output of the second rectifying means equals the output of the first rectifying means; start means for initiating a start pulse prior to each stop pulse and at a time corresponding to a particular value of the said voltage envelope; indicating means responsive to the said start pulse and the said stop pulse for indicating the decibels equivalent to the signal power ratio defined by the ratio of the output of the second rectifying means at the time of the start pulse to the output of the second rectifying means at the time of the stop pulse.

References Cited

UNITED STATES PATENTS

| | | | |
|---|---|---|---|
| 2,228,883 | 1/1941 | Morgan | 324—111 |
| 2,647,236 | 7/1953 | Saunderson | 324—140 |
| 2,700,501 | 1/1955 | Wong | 324—99 X |
| 2,913,668 | 11/1959 | Lide | 324—140 |
| 2,916,702 | 12/1959 | Bigelow | 324—111 |
| 2,994,825 | 8/1961 | Anderson | 324—111 X |
| 2,220,602 | 11/1940 | Hellmann | 324—111 |

RUDOLPH V. ROLINEC, *Primary Examiner.*

E. F. KARLSEN, *Assistant Examiner.*